June 7, 1932. K. H. CONLEY 1,861,954

COUNTERBALANCING DEVICE FOR MACHINE TOOLS

Filed Aug. 27, 1930 3 Sheets-Sheet 1

INVENTOR.
*Kurt H. Conley*
BY
*Chamberlain & Newman*
ATTORNEYS.

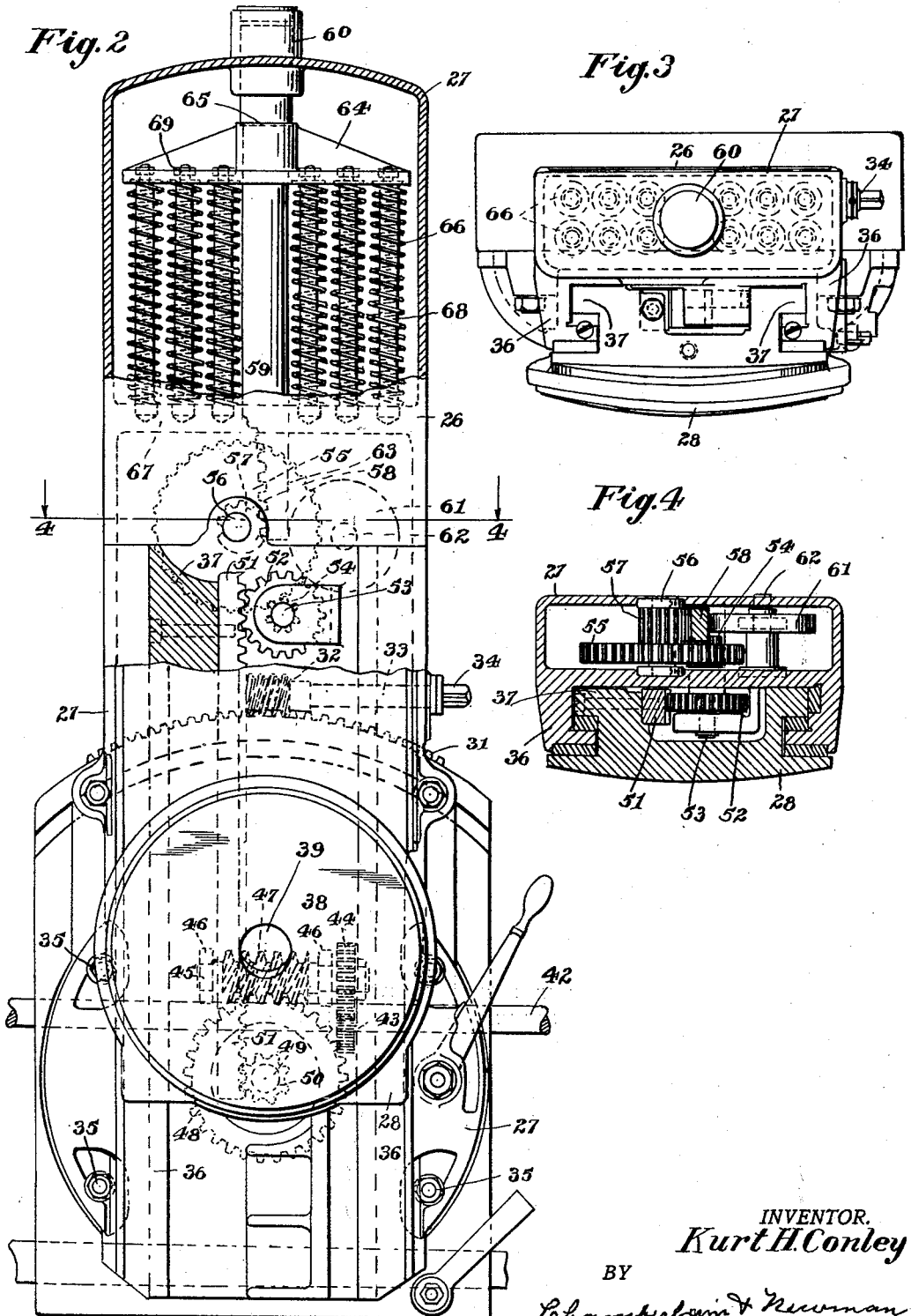

June 7, 1932. K. H. CONLEY 1,861,954
COUNTERBALANCING DEVICE FOR MACHINE TOOLS
Filed Aug. 27, 1930 3 Sheets-Sheet 3
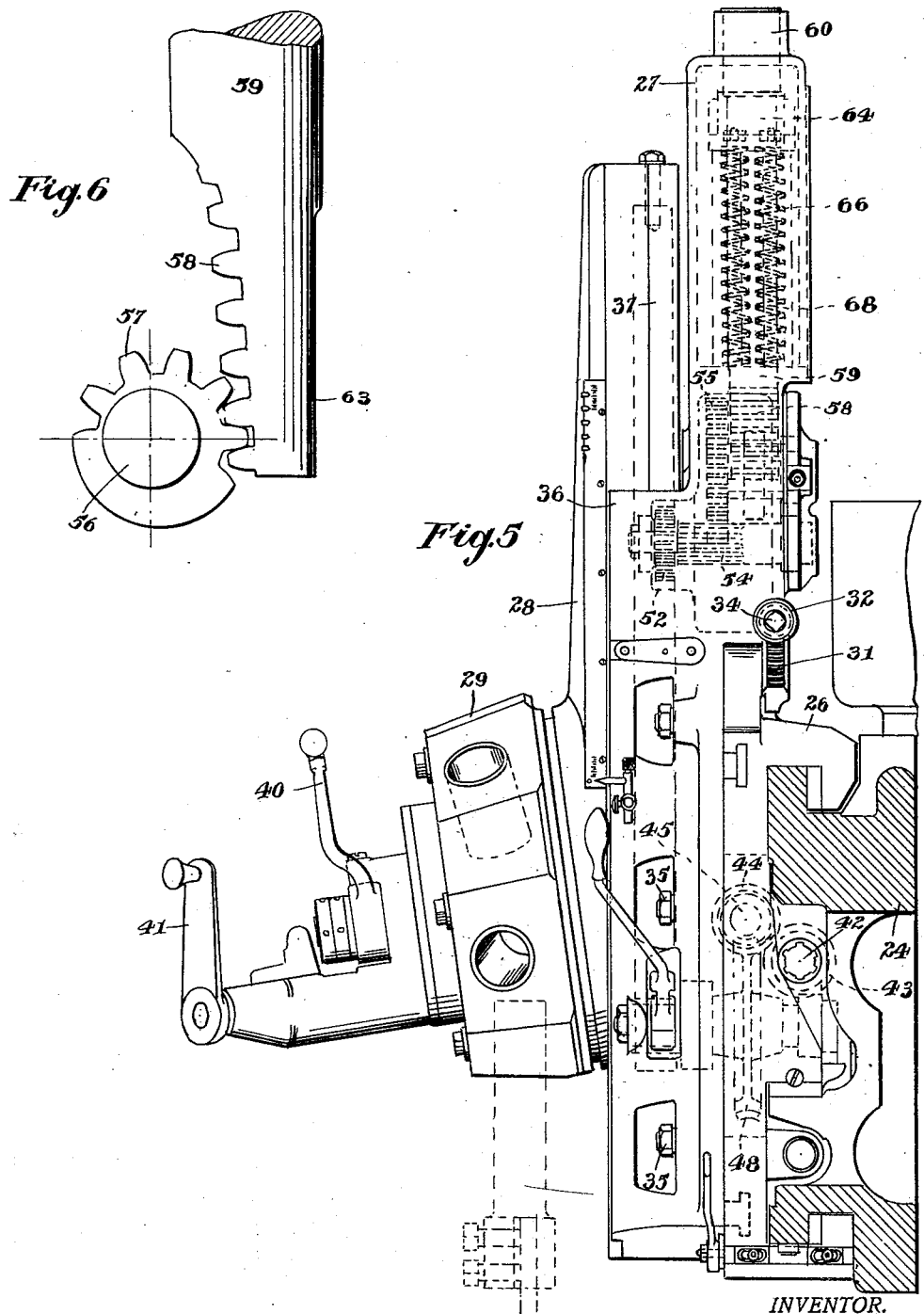
INVENTOR.
Kurt H. Conley
BY
Chamberlain & Newman
ATTORNEYS.

Patented June 7, 1932

1,861,954

UNITED STATES PATENT OFFICE

KURT H. CONLEY, OF BRIDGEPORT, CONNECTICUT, ASSIGNOR TO THE BULLARD COMPANY, OF BRIDGEPORT, CONNECTICUT, A CORPORATION OF CONNECTICUT

COUNTERBALANCING DEVICE FOR MACHINE TOOLS

Application filed August 27, 1930. Serial No. 478,053.

This invention relates to new and useful improvements in counterbalancing devices for tool-carrying heads as used on machine tools such as "vertical turret lathes", boring mills, and the like. The invention is equally applicable to either front or side heads and is also adapted for counterbalancing other vertically movable parts of a machine.

Counterbalancing devices for machines of this type now generally employ weights as a primary counterbalancing factor, the same being connected to the cross-rail, tool slide or other member to be counterbalanced by means of a chain or cable.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a side elevation of an improved type of "vertical turret lathe" adapted to employ one or more side tool slides and one or more front tool slides, the latter, as shown, being provided with my invention;

Fig. 2 is an enlarged front elevation of the front tool slide, shown in Fig. 1, and its swivel, both being broken away to illustrate the operating connections including the nest of springs;

Fig. 3 is a top end view of the slide and attached swivel shown in Fig. 2;

Fig. 4 is a cross section taken on line 4—4 of Fig. 2;

Fig. 5 shows a side elevation of the tool slide, its turret and swivel, for supporting the slide, adjustably positioned on a cross-rail shown in cross section; and Fig. 6 is an enlarged front view of an eccentric gear, segment and inclined rack, shown in dotted lines in Fig. 2.

Figure 1:
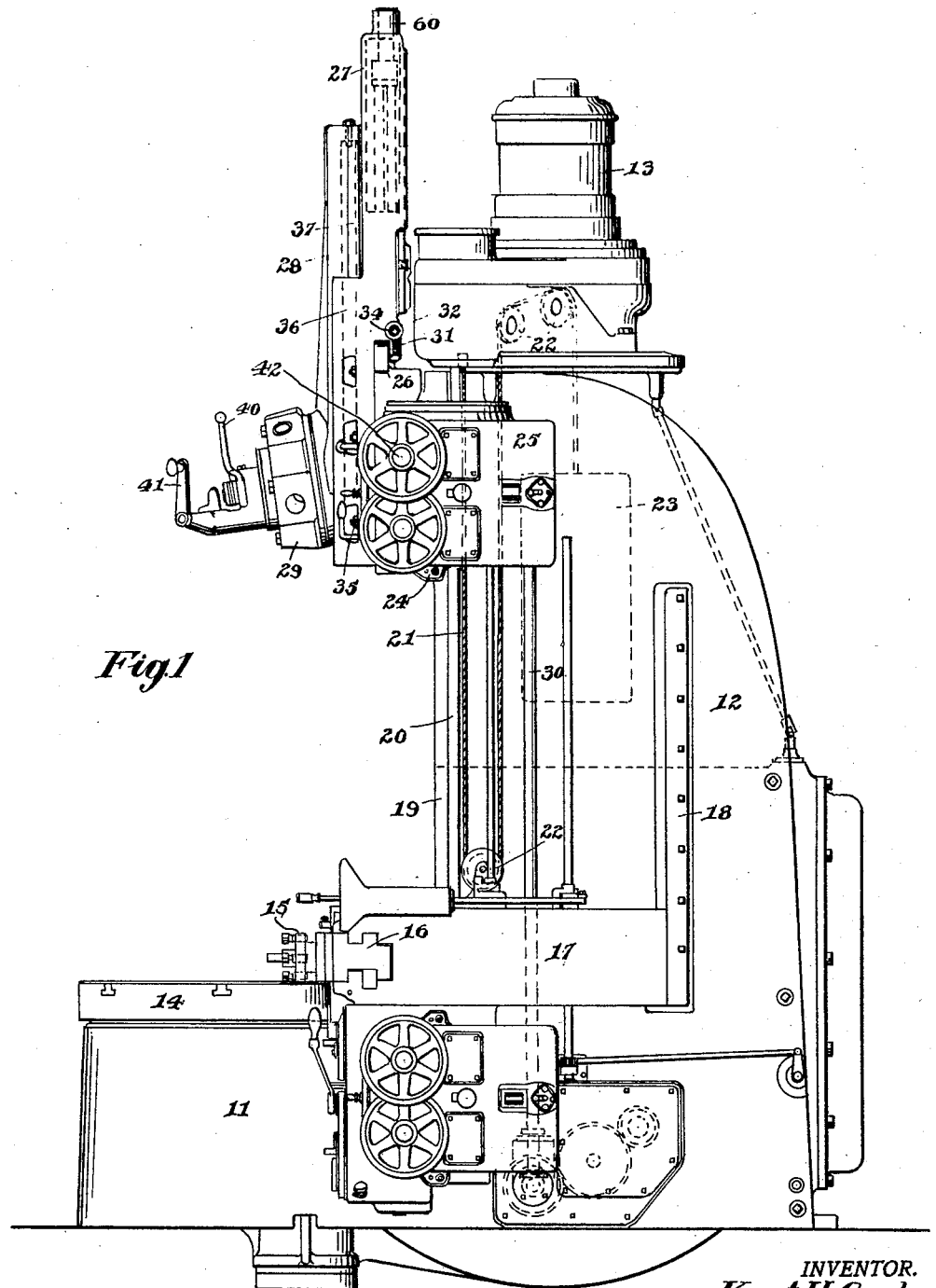

The invention as herein shown is applied to an improved type of "Bullard vertical turret lathe", illustrated in side elevation, Fig. 1. Referring to this figure by reference characters, 11 indicates the bed, 12 uprights upon the top of which is mounted a motor 13 for driving the machine. 14 represents a rotary table upon which the work to be turned is secured.

15 represents a side tool head and 16 a tool head slide therefor that is adapted to move crosswise of the machine in suitable guideways of a saddle 17. This saddle is mounted in vertical guide-ways 18 and 19 on the upright and is adapted to be raised and lowered through shafts 20 and 30, the weight of the said saddle and tool head being counterbalanced through a cable connection 21, pulleys 22, and weight 23.

24 represents a cross-rail which carries a feed box 25 upon its end. This cross rail and feed box are adapted to be raised and lowered on suitable vertical ways of the upright 12 for vertically adjusting the unit comprising said cross-rail, feed box, saddle 26, swivel 27, tool slide 28 and turret 29, to position the said unit in proximity to the work secured upon the table, preparatory to operations thereon, and likewise for returning the said unit to its upper position. This feed box 25 houses mechanism for feeding the saddle crosswise upon the rail and the turret slide vertically as in the feeding of the tools carried by the turret to and from the work, the said mechanism within the feed box being operated through the before mentioned shaft 20 and a second vertical shaft 30.

The swivel 27 is mounted for angular adjustment on the saddle 26 through the medium of a worm gear segment 31 which is engaged and operated by a worm 32 mounted upon a short shaft 33 having an exposed head 34 for wrench engagement, after which it may be secured in position on the swivel by nuts 35. This swivel includes parallel longitudinal guideways 36 to receive corresponding guides 37 of the tool slide whereby the latter is permitted to move longitudinally with respect to the swivel, as will be clearly apparent from Figs. 2, 3, and 5.

The lower end of the tool slide 28 is provided with a circular face 38 having a central hole 39 therein for the mounting of a rotatable turret 29 which may be of the usual or any preferred construction, the one herein shown being of an improved type and provided with a locking lever 40 for securing the turret in its several adjusted positions, and is further provided with a handle 41 whereby the turret is rotated and positioned when unlocked by the handle 40 before mentioned.

From the foregoing it will be seen that the tool slide is mounted for vertical slidable movement within ways of the swivel; therefore, it is not only necessary to provide means for operating the tool slide longitudinally of the swivel, which is vertical as shown in the drawings, but it is also necessary to provide simple and compact means intermediate of the two said members for counterbalancing the weight of the slide so that the load of the tool slide will be relieved from the slide operating mechanism with a view of permitting the slide to be easily raised or lowered. I have therefore provided both of these means and will first describe that for operating the tool slide, and second the equalizing counterbalancing mechanism which is connected to be operated by and in unison with the said tool slide operating means.

This vertical feed for the front tool slide is derived from the feed shaft 42, see Figs. 1, 2 and 5, that is journaled in the ends of the cross-rail and carries a gear 43, see dotted lines in Fig. 2, that drives a second gear 44 on a short shaft 45 journaled in bearings 46 of the saddle. This short shaft 45 carries a worm 47 that meshes with and drives a worm gear 48 upon a shaft 49 disposed at a right angle, also journaled in the swivel and which carries a small pinion 50 meshing with a rack 51 secured to and within the tool slide 28.

The equalizing counterbalancing mechanism above referred to is for the most part contained within the upper portion of the swivel and is connected with the slide operating mechanism through the rack 51 before mentioned. The upper end portion of this rack engages a gear 52 mounted upon a short shaft 53 journaled in the swivel 27, see Fig. 4. A pinion 54 is mounted upon the rear end portion of this short shaft 53, that meshes with a gear 55 mounted upon a short shaft 56 journaled in the swivel and carrying a relatively small eccentric pinion 57, see Figs. 2, 4, and 6, which engages with an inclined rack 58 formed on the side of the lower end portion of a bar 59, the upper end of said bar being slidably mounted in a sleeve 60 formed in the upper end portion of the swivel. This bar is obviously adapted to reciprocate within said sleeve when actuated through the before mentioned train of mechanism, it being shown in its upper position in Fig. 2. In this connection it will also be seen that a roll 61 mounted upon a stud 62 is positioned against the flattened surface 63 of the bar 59 opposite the rack 58 so as to hold the said rack in vertical operative alignment and in engagement with the eccentric gear.

The eccentric gear and inclined rack are placed in such operative relation that when the engaged tooth of the pinion is on the maximum radius of the pinion, as shown in Fig. 6, the springs will be at their maximum length and will be exerting their minimum amount of pressure, whereas when the tool slide advances in a downward direction the springs are correspondingly compressed and therefore exert a correspondingly increasing pressure. This increase in pressure is compensated for by the fact that the engaged teeth of the pinion are of a decreasing radius thereby providing a shorter leverage and uniform counterbalancing means for the tool slide.

A yoke 64 is mounted upon the upper portion of the bar 59 being supported against an annular shoulder 65 of said bar by means of a series of springs 66 positioned between the under face of the said yoke and a cross wall 67 of the swivel. These springs, of which there may be any desired number, are mounted upon rods 68 the lower ends of which are preferably secured within the said wall and the upper ends mounted within holes 69 of the yoke so that they may be free to slide within the holes as the yoke moves down within the swivel.

Having thus described my invention, what I claim and desire to secure by Letters Patent is:

1. In a counterbalancing device for machine tools, the combination with a supporting member, a member slidably mounted therein and carrying a rack, power means for operating the rack and slidable member longitudinally in the supporting member, counterbalancing springs within the supporting member, a yoke and bar supported by the springs, said bar carrying a rack, a gear to engage the rack, operative connections intermediate said gear and rack of the movable member.

2. In a counterbalancing device for machine tools, the combination with a supporting member having guide-ways, a member mounted to slide in said guide-ways and carrying a rack, power means for operating the rack and slidable member in the guide-ways of the supporting member, counterbalancing means within the supporting member, a bar supported by the counterbalancing means and carrying a rack, a gear to engage the rack, operative connections intermediate said gear and rack of the movable member.

3. In a counterbalancing device for machine tools, the combination with a supporting member, a member slidably mounted therein and carrying a rack, power means engaging the rack to operate the slidable member, counterbalancing springs, a yoke and bar supported by the springs, said bar carrying an inclined rack, an eccentric gear engaging the rack, operative connections intermediate said gear and rack of the slidable member.

4. In a counterbalancing device for machine tools, the combination with a supporting member, a member slidably mounted therein and carrying a rack, power means engaging the rack to operate the slidable member, counterbalancing springs, a yoke and bar supported by the springs, said bar carrying an inclined rack, an eccentric gear engaging the rack, a roller bearing against which the bar reciprocates, operative connections intermediate said gear and rack of the slidable member.

5. In a counterbalancing device for machine tools, the combination with a swivel member having guide-ways, a tool slide mounted to slide in said guide-ways and carrying a rack, power means for operating the rack and tool slide in the guide-ways of the swivel member, counterbalancing springs within the tool slide, a bar supported by the springs, carrying an inclined rack, an eccentric gear in engagement with the rack, operative connections intermediate said gear and the rack of the slidable member.

6. In a tool slide operating means for machine tools, the combination with a supporting member having guide-ways, a tool slide mounted to slide in said guide-ways and carrying a rack, means for operating the rack and tool slide in the guide-ways of the supporting member, including a gear to engage the rack, a second gear upon the shaft of said gear, a worm, a power shaft, counterbalancing means within the supporting member and gear connection with the said worm.

7. In a counterbalancing device for machine tools, the combination with a swivel member having guide-ways, a tool slide mounted to slide in said guide-ways and carrying a rack, power means for operating the rack and slidable member in the guide-ways of the supporting member, including a gear to engage the rack, a second gear upon the shaft of said gear, a worm, a power shaft, and gear connection with the said worm, a second gear in engagement with the rack, an eccentric gear, operative connection between said second gear and the eccentric gear, a movable bar having an inclined rack connection with said eccentric gear, and spring means for supporting the bar with respect to the swivel member.

8. In a counterbalancing device for machine tools, the combination with a swivel, a tool slide mounted in said swivel and carrying a rack, power means for reciprocating the rack and tool slide, counterbalancing springs, a yoke and bar for engaging the springs, weight-resisting compensating means intermediate said bar and tool slide for providing a uniform counteracting resistance to the weight of the tool slide.

9. In a counterbalancing device for machine tools, the combination with a cross-rail, a feed shaft, a saddle, a swivel, a tool slide mounted in the swivel and carrying a rack, worm and gear connections with said rack for operating the tool slide in the swivel, springs intermediate the swivel and tool slide for supporting the tool slide, means intermediate the springs and tool slide for providing a uniform support for the tool slide while in various adjusted positions.

10. In a counterbalancing device for machine tools, the combination with a swivel member having guide-ways, a tool slide mounted in said guide-ways and carrying a rack, power means for operating the rack and tool slide in the guide-ways of the swivel member, compression springs, means for engaging said springs, an eccentric operatively connected with said engaging means, operative connections intermediate said eccentric and slide of the movable member, whereby the compression of the springs, movement of the bar and slide are in unison to uniformly counterbalance the weight of the slide by said springs when in various compressed positions.

11. In a counterbalancing device for machine tools, the combination with a swivel, a tool slide mounted in said swivel and carrying a rack, power means for reciprocating the rack and tool slide, an eccentric gear, operating connections thereof with the tool slide rack, a yoke and bar in operative engagement with the gear, and springs between the bar and swivel to uniformly support the tool slide in its various adjusted positions.

12. In a counterbalancing device for machine tools, the combination with a swivel member having guide-ways, a tool slide mounted to slide in said guide-ways, power means for operating the tool slide in the guide-ways of the swivel member, counterbalancing springs within the tool slide, a bar supported by the springs carrying an inclined rack, an eccentric gear in engagement with the rack, operative connections intermediate said gear and the slidable member.

Signed at Bridgeport in the county of Fairfield and State of Connecticut this 25th day of August, A. D. 1930.

KURT H. CONLEY.